US012566694B2

(12) United States Patent
Wu et al.

(10) Patent No.: US 12,566,694 B2
(45) Date of Patent: Mar. 3, 2026

(54) MANAGING LOGIC UNITS OF MEMORY DEVICES

(71) Applicant: Macronix International Co., Ltd., Hsinchu (TW)

(72) Inventors: Sheng-Lun Wu, Toufen (TW); Chun-Lien Su, Taichung (TW)

(73) Assignee: Macronix International Co., Ltd., Hsinchu (TW)

( * ) Notice: Subject to any disclaimer, the term of this patent is extended or adjusted under 35 U.S.C. 154(b) by 26 days.

(21) Appl. No.: 18/433,797

(22) Filed: Feb. 6, 2024

(65) Prior Publication Data

US 2025/0252042 A1     Aug. 7, 2025

(51) Int. Cl.
*G06F 12/02* (2006.01)

(52) U.S. Cl.
CPC .................................. *G06F 12/0246* (2013.01)

(58) Field of Classification Search
CPC ........................... G06F 12/0246; G06F 3/0679
USPC .............. 713/1, 2, 100; 710/7, 8, 9, 26, 302
See application file for complete search history.

(56) References Cited

U.S. PATENT DOCUMENTS

| | | | | | |
|---|---|---|---|---|---|
| 5,572,707 A | * | 11/1996 | Rozman | .............. | G06F 12/0246 |
| | | | | | 711/170 |
| 6,484,229 B1 | * | 11/2002 | Ichikawa | .............. | G06F 3/0613 |
| | | | | | 711/152 |
| 2011/0258425 A1 | * | 10/2011 | Galbo | ..................... | G06F 3/062 |
| | | | | | 711/E12.008 |
| 2012/0311297 A1 | * | 12/2012 | Lee | ..................... | G06F 13/4247 |
| | | | | | 711/202 |
| 2013/0275713 A1 | | 10/2013 | Galbo et al. | | |
| 2022/0091775 A1 | * | 3/2022 | Shridhar | ............... | G06F 3/0659 |
| 2024/0111527 A1 | * | 4/2024 | Wu | ....................... | G06F 15/163 |

FOREIGN PATENT DOCUMENTS

| | | | | |
|---|---|---|---|---|
| TW | I817888 | | 10/2023 | |
| TW | I817888 B | * | 10/2023 | ......... G06F 9/30021 |

* cited by examiner

*Primary Examiner* — Kaushikkumar M Patel
*Assistant Examiner* — Christian Joseph O'Connell
(74) *Attorney, Agent, or Firm* — Fish & Richardson P.C.

(57) ABSTRACT

Semiconductor devices, methods, and memory systems for managing logic units are provided. In one aspect, a semiconductor device includes a logic unit associated with an identifier (ID). The logic unit includes a control logic and a reporting unit coupled to the control logic. The semiconductor device also includes a control interface coupled to the reporting unit. The control logic is configured to: receive, from the control interface, an enumeration command in an iteration; drive, using the reporting unit, one or more bits of the ID to the control interface; and in response to determining that a received bit from the control interface mismatches a driven bit of the ID, stop driving one or more additional bits of the ID to the control interface.

20 Claims, 8 Drawing Sheets

280

400A

| COMMAND | LUN INDEX + ADDRESS |
|---------|---------------------|

| Unique ID | COMMAND | ADDRESS |
|-----------|---------|---------|

FIG. 4B

500A

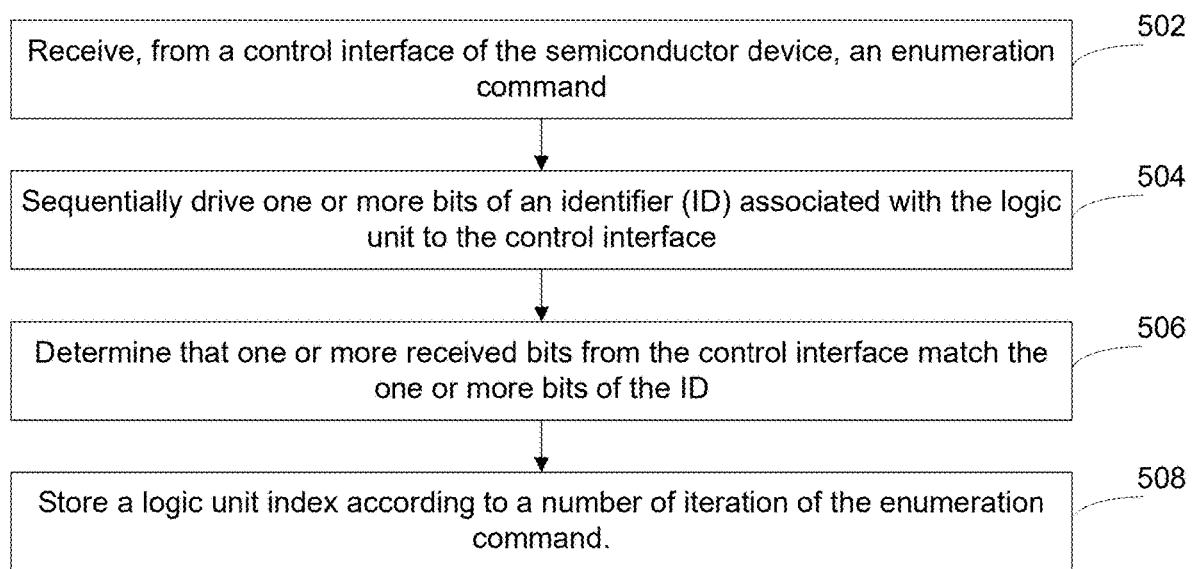

502

Receive, from a control interface of the semiconductor device, an enumeration command

504

Sequentially drive one or more bits of an identifier (ID) associated with the logic unit to the control interface

506

Determine that one or more received bits from the control interface match the one or more bits of the ID

508

Store a logic unit index according to a number of iteration of the enumeration command.

Receive, from the control interface, a message for accessing data stored in the logic unit, wherein the message comprises a target ID, a data access command, and an address

524

Compare the ID with the target ID

526

In response to determining that the ID matches the target ID, access the data according to the data access command.

MANAGING LOGIC UNITS OF MEMORY DEVICES

BACKGROUND

The density of storage units in memory devices has been increasing over the past decades, largely driven by the growing demand for data storage capacity. A high-density memory device, such as a NAND flash memory device, usually includes one or more logic units. Each logic unit can be manufactured as a die that typically has a plurality of memory cells collectively accessible as a page. For memory devices having a large number of logic units, the logic units are often stacked one above another, creating a vertical structure.

SUMMARY

The present disclosure describes techniques for managing logic units of memory devices.

One aspect of the present disclosure features a semiconductor device including: a logic unit associated with an identifier (ID), the logic unit including a control logic and a reporting unit coupled to the control logic; and a control interface coupled to the reporting unit. The control logic is configured to: receive, from the control interface, an enumeration command in an iteration, drive, using the reporting unit, one or more bits of the ID to the control interface, and in response to determining that a received bit from the control interface mismatches a driven bit of the ID, stop driving one or more additional bits of the ID to the control interface.

In some implementations, the control logic is configured to: in response to determining that received bits from the control interface match driven bits of the ID, store a logic unit index in the control logic according to a number of the iteration.

In some implementations, the control logic is configured to: in response to determining that the received bits from the control interface match the driven bits of the ID, disable driving bits of the ID to the control interface in one or more sequential iterations.

In some implementations, the control logic includes at least one of: a non-volatile fuse configured to store the logic unit index, or a volatile register configured to store the logic unit index.

In some implementations, the logic unit is configured to receive a message for accessing data stored in the logic unit, and the message includes the logic unit index, an address of the logic unit, and a data access command.

In some implementations, the enumeration command includes the number of the iteration.

In some implementations, the reporting unit includes a comparator configured to compare the received bits with the driven bits of the ID, and where the control logic is configured to determine that the received bits match the driven bits of the ID based on an output of the comparator.

In some implementations, the reporting unit is coupled to the control interface via an open drain circuit.

In some implementations, the ID includes at least one of: a serial number of the logic unit, or a physical unclonable function (PUF) of the logic unit.

In some implementations, the logic unit includes at least one of a NAND flash die or a NOR flash die.

In some implementations, the logic unit is configured to: receive, from the control interface, a message for accessing data stored in the logic unit, where the message includes a target ID, a data access command, and an address, compare the ID with the target ID, and in response to determining that the ID matches the target ID, access the data according to the data access command.

In some implementations, the logic unit is further configured to: receive, from the control interface, a special access message, and perform a responsive action according to the special access message.

Another aspect of the present disclosure features a method for operating a logic unit in a semiconductor device. The method includes: receiving, from a control interface of the semiconductor device, an enumeration command in an iteration; driving one or more bits of an identifier (ID) associated with the logic unit to the control interface; and in response to determining that a received bit from the control interface mismatches a driven bit of the ID, stopping driving one or more additional bits of the ID to the control interface.

In some implementations, the logic unit is a first logic unit and the ID is a first ID, and where the semiconductor device further includes a second logic unit associated with a second ID. The method further includes: receiving, from the control interface, a second enumeration command in a second iteration; driving one or more bits of the second ID associated with the second logic unit to the control interface; and in response to determining that received bits from the control interface match driven bits of the second ID, storing a logic unit index for the second logic unit in the control logic according to a number of the second iteration, and disabling driving bits of the second ID to the control interface in one or more sequential iterations.

In some implementations, storing the logic unit index includes: storing the logic unit index in at least one of a non-volatile fuse or a volatile register.

In some implementations, the method further includes: accessing data stored in the second logic unit according to a message, where the message includes the logic unit index, an address of the second logic unit, and a data access command.

In some implementations, the enumeration command includes the number of the second iteration.

In some implementations, determining that the received bits from the control interface match the driven bits of the second ID includes: determining that the received bits from the control interface match the driven bits of the second ID based on an output of a comparator, the output being a result of the comparator comparing the received bits with the driven bits of the second ID.

In some implementations, the method further includes: receiving, from the control interface, a message for accessing data stored in the logic unit, where the message includes a target ID, a data access command, and an address; comparing the ID with the target ID; and in response to determining that the ID matches the target ID, accessing the data according to the data access command.

In some implementations, the method further includes: receiving, from the control interface, a special access message; and performing a responsive action according to the special access message.

Another aspect of the present disclosure features a memory system including: a memory device including an array of memory cells; and a controller coupled to the memory device and configured to control the memory device. The memory device includes: a logic unit associated with an identifier (ID), the logic unit including a control logic and a reporting unit coupled to the control logic; and a control interface coupled to the reporting unit. The control logic is configured to: receive, from the control interface, an enumeration command in an iteration, drive, using the reporting unit, one or more bits of the ID to the control interface, and in response to determining that a received bit from the control interface mismatches a driven bit of the ID, stop driving one or more additional bits of the ID to the control interface.

In some implementations, the control logic is configured to: in response to determining that received bits from the control interface match driven bits of the ID, store a logic unit index in the control logic according to a number of the iteration, and disable driving bits of the ID to the control interface in one or more sequential iterations.

In some implementations, the logic unit is configured to receive a message for accessing data stored in the logic unit, and where the message includes the logic unit index, an address of the logic unit, and a data access command.

In some implementations, the logic unit is configured to: receive, from the control interface, a message for accessing data stored in the logic unit, where the message includes a target ID, a data access command, and an address, compare the ID with the target ID, and in response to determining that the ID matches the target ID, access the data according to the data access command.

Another aspect of the present disclosure features a semiconductor device. The semiconductor device includes a logic unit associated with an identifier (ID). The logic unit includes a control logic and a reporting unit coupled to the control logic. The semiconductor device also includes a control interface coupled to the reporting unit. The control logic is configured to receive, from the control interface, an enumeration command in an iteration. The control logic is configured to sequentially drive, using the reporting unit, one or more bits of the ID to the control interface. The control logic is configured to determine that one or more received bits from the control interface match the one or more bits of the ID. The control logic is configured to store a logic unit index in the control logic according to a number of the iteration.

In some implementations, the logic unit is a first logic unit, the ID is a first ID, the control logic is a first control logic, and the reporting unit is a first reporting unit. The semiconductor device further includes a second logic unit associated with a second ID. The second logic unit circuit includes a second control logic and a second reporting unit. The second reporting unit is coupled to the second control logic and to the control interface. The second control logic is configured to: receive, from the control interface, the enumeration command in the iteration, sequentially drive, via the second reporting unit, one or more bits of the second ID to the control interface, determine that at least one of the one or more received bits from the control interface mismatch at least one of the one or more bits of the second ID, and stop driving additional one or more bits of the second ID to the control interface.

In some implementations, the control logic includes a non-volatile fuse that stores the logic unit index.

In some implementations, the control logic includes a volatile register that stores the logic unit index. The volatile register can be configured to reset at a beginning of a power cycle.

In some implementations, the logic unit is configured to receive a message for accessing data stored in the logic unit. The message includes the logic unit index, an address of the logic unit, and a data access command.

In some implementations, the enumeration command includes the number of the iteration.

In some implementations, the reporting unit includes a comparator that compares the one or more received bits with the one or more bits of the ID, and the control logic is configured to determine that the one or more received bits match the one or more bits of the ID based on an output of the comparator.

In some implementations, the reporting unit is coupled to the control interface via an open drain circuit.

In some implementations, the control interface includes at least one of: an addressing pad, or a ready-busy interface.

In some implementations, the ID includes at least one of: a serial number of the logic unit, or a physical unclonable function (PUF) of the logic unit.

In some implementations, the logic unit includes at least one of: a NAND flash die, or a NOR flash die.

Another aspect of the present disclosure features a semiconductor device. The semiconductor device includes a logic unit associated with an ID. The logic unit includes a control interface coupled to the logic unit. The logic unit is configured to receive, from the control interface, a message for accessing data stored in the logic unit. The message includes a target ID, a data access command, and an address. The logic unit is configured to compare the ID with the target ID. The logic unit is configured to, in response to determining that the ID matches the target ID, access the data according to the data access command.

In some implementations, the logic unit is further configured to: receive, from the control interface, a special access message, and perform a responsive action according to the special access message.

Another aspect of the present disclosure features a method for operating a logic unit in a semiconductor device. The method includes receiving, from a control interface of the semiconductor device, an enumeration command. The method includes sequentially driving one or more bits of an ID associated with the logic unit to the control interface. The method includes determining that one or more received bits from the control interface match the one or more bits of the ID. The method includes storing a logic unit index according to a number of iteration of the enumeration command.

In some implementations, the logic unit is a first logic unit and the ID is a first ID. The semiconductor device further includes a second logic unit associated with a second ID. The second logic unit is configured to receive the enumeration command from the control interface and sequentially drive one or more bits of the second ID to the control interface. The method further includes: causing the second logic unit to determine that at least one of the one or more received bits from the control interface mismatch at least one of the one or more bits of the second ID, and causing the second logic unit to stop driving additional one or more bits of the second ID to the control interface.

In some implementations, storing the logic unit index includes: storing the logic unit index using a non-volatile fuse.

In some implementations, storing the logic unit index includes: storing the logic unit index using a volatile register.

In some implementations, the method further includes: resetting the volatile register at a beginning of a power cycle.

In some implementations, the method further includes accessing data stored in the logic unit according to a message. The message includes the logic unit index, an address of the logic unit, and a data access command.

In some implementations, the enumeration command includes the number of the iteration.

In some implementations, determining that the one or more received bits from the control interface match the one or more bits of the ID includes receiving an output of a comparator. The comparator is configured to compare the one or more received bits from the reporting unit with the one or more bits of the ID.

Another aspect of the present disclosure features a method for operating a logic unit in a semiconductor device. The method includes receiving, from the control interface, a message for accessing data stored in the logic unit. The message includes a target ID, a data access command, and an address. The method includes comparing the ID with the target ID. The method includes, in response to determining that the ID matches the target ID, accessing the data according to the data access command.

In some implementations, the method further includes: receiving, from the control interface, a special access message; and performing a responsive action according to the special access message.

Another aspect of the present disclosure features a memory device. The memory device includes a controller. The memory device includes a logic unit associated with an ID. The logic unit includes a control logic and a reporting unit coupled to the control logic. The memory device includes a control interface coupled to the reporting unit and to the controller. The control logic is configured to receive, from the controller via the control interface, an enumeration command in an iteration. The control logic is configured to sequentially drive, via the reporting unit, one or more bits of the ID to the control interface. The control logic is configured to determine that one or more received bits from the control interface match the one or more bits of the ID. The control logic is configured to store a logic unit index in the control logic according to a number of the iteration.

In some implementations, the logic unit is a first logic unit, the ID is a first ID, the control logic is a first control logic, and the reporting unit is a first reporting unit. The semiconductor device further includes a second logic unit associated with a second ID. The second logic circuit includes a second control logic and a second reporting unit, the second reporting unit being coupled to the second control logic and to the control interface. The second control logic is configured to: receive, from the control interface, the enumeration command in the iteration, sequentially drive, via the second reporting unit, one or more bits of the second ID to the control interface, determine that at least one of the one or more received bits from the control interface mismatch at least one of the one or more bits of the second ID, and stop driving additional one or more bits of the second ID to the control interface.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIGS. 4A and 4B each illustrate an example message structure, according to one or more implementations of the present disclosure.

FIGS. 5A and 5B each illustrate a flowchart showing an example method, according to one or more implementations of the present disclosure.

DETAILED DESCRIPTION

A memory device typically has one or more memory units (which can be, for example, memory chips), with each memory unit having one or more logic units (LUNs). Each LUN can be used to store data and can be manufactured as a die, such as a NAND flash die or a NOR flash die. With the increase of LUN density in memory devices, it has become common to stack multiple dies one above another in the same memory unit package. The stacking of LUNs can make it challenging to route wire to access each LUN. Some existing techniques use multiple LUN addressing pads with vias that connect the LUNs to a supply voltage (e.g., $V_{CC}$ or Ground [GND]), with each LUN associated with a different pattern of connection. As such, a host (e.g., a computer) can access a LUN by providing a signal that matches the pattern of connection of that LUN. However, when the number of LUNs in a memory unit is large, it can be challenging and/or costly to manufacture the LUNs with the addressing pads and the bonding wire to support a large number of patterns of connection.

This disclosure provides techniques to manage LUNs in a memory device, using LUN addressing schemes that enable access of a large number of LUNs in a memory chip while limiting cost and/or structural challenges (e.g., with masking or substrate). As discussed below, implementations of this disclosure allow the LUNs to be accessed based on signals received from a control interface, without the need of large number of addressing pads or complex patterns of connection. As such, implementations of this disclosure advantageously streamline the LUN access process and reduces the complexity and cost of manufacture.

Figure 1:
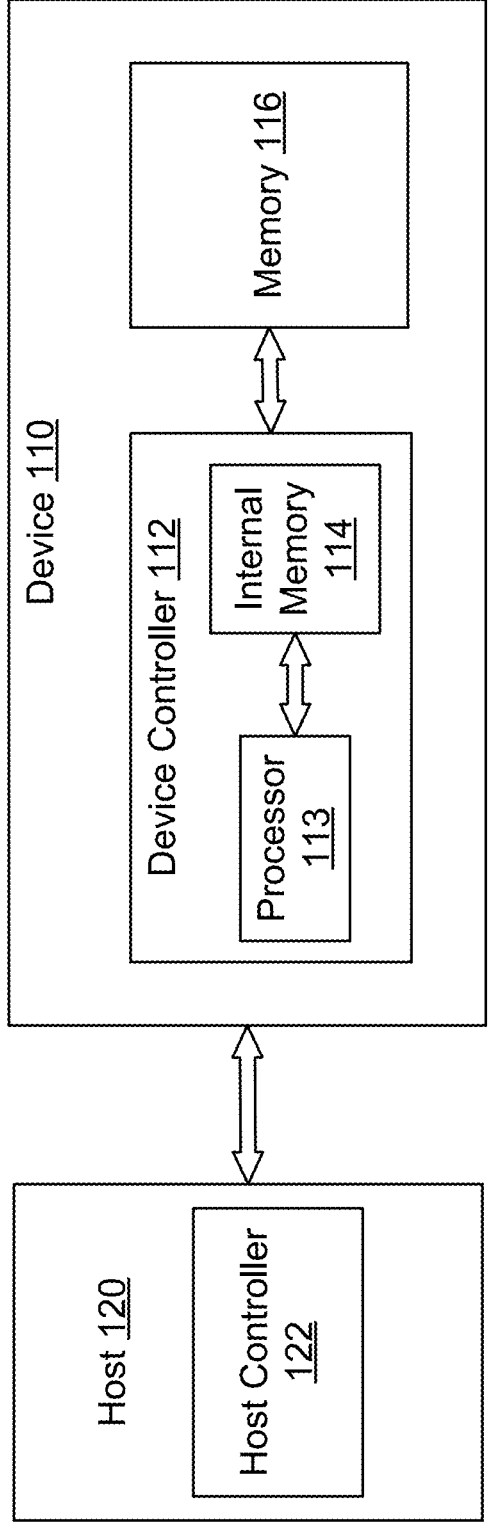
FIG. 1 illustrates an example of a system including a memory device, according to one or more implementations of the present disclosure.
Figure 1:

FIG. 1 illustrates an example of a system 100. The system 100 includes a device 110 and a host 120. The device 110 includes a device controller 112 and a memory 116. The device controller 112 includes a processor 113 and an internal memory 114. In some implementations, the device 110 includes a plurality of memories 116 that are coupled to the device controller 112. The host 120 includes a host controller 122 that can include at least one processor and at least one memory coupled to the at least one processor and storing programming instructions for execution by the at least one processor to perform one or more corresponding operations.

The device controller 112 is a general-purpose microprocessor, or an application-specific microcontroller. In some implementations, the device controller 112 is a memory controller for the device 110. The following sections describe the various techniques based on implementations in which the device controller 112 is a memory controller. However, the techniques described in the following sections are also applicable in implementations in which the device controller 112 is another type of controller that is different from a memory controller.

The processor 113 is configured to execute instructions and process data. The instructions include firmware instructions and/or other program instructions that are stored as firmware code and/or other program code, respectively, in the secondary memory. The data includes program data corresponding to the firmware and/or other programs executed by the processor, among other suitable data. In some implementations, the processor 113 is a general-purpose microprocessor, or an application-specific microcontroller.

The processor 113 accesses instructions and data from the internal memory 114. In some implementations, the internal memory 114 is a Static Random Access Memory (SRAM) or a Dynamic Random Access Memory (DRAM) or a combination thereof. For example, in some implementations, when the device 110 is an eMMC, an SD card or a smart watch, the internal memory 114 is an SRAM. In some implementations, when the device 110 is a digital camera or a media player, the internal memory 114 is DRAM.

In some implementations, the internal memory is a cache memory that is included in the device controller 112, as shown in FIG. 1. The internal memory 114 stores instruction codes, which correspond to the instructions executed by the processor 113, and/or the data that are requested by the processor 113 during runtime.

The device controller 112 may transfer the instruction code and/or the data from the memory 116 to the internal memory 114 or to the host 120. The memory 116 can be a semiconductor device. In some implementations, the memory 116 is a non-volatile memory that is configured for long-term storage of instructions and/or data, e.g., a NAND flash memory device, or some other suitable non-volatile memory device. In implementations where the memory 116 is NAND flash memory, the device 110 is a flash memory device, e.g., a flash memory card, and the device controller 112 is a NAND flash controller. For example, in some implementations, when the device 110 is an eMMC or an SD card, the memory 116 is a NAND flash.

The memory 116 includes a plurality of blocks. The memory 116 can be a two-dimensional (2D) memory including 2D memory blocks. The memory 116 can also be a three-dimensional (3D) memory including 3D memory blocks.

In some implementations, the memory 116 includes one or more memory units. Each memory unit can include one or more LUNs. A LUN can include a memory chip or a memory die. Each LUN can include a number of memory arrays and peripheral circuitry thereon. A memory array can include a number of planes, with each plane including a number of physical blocks of memory cells. Each physical block can include a number of pages of memory cells that can store a number of sectors of data.

Figure 2A:
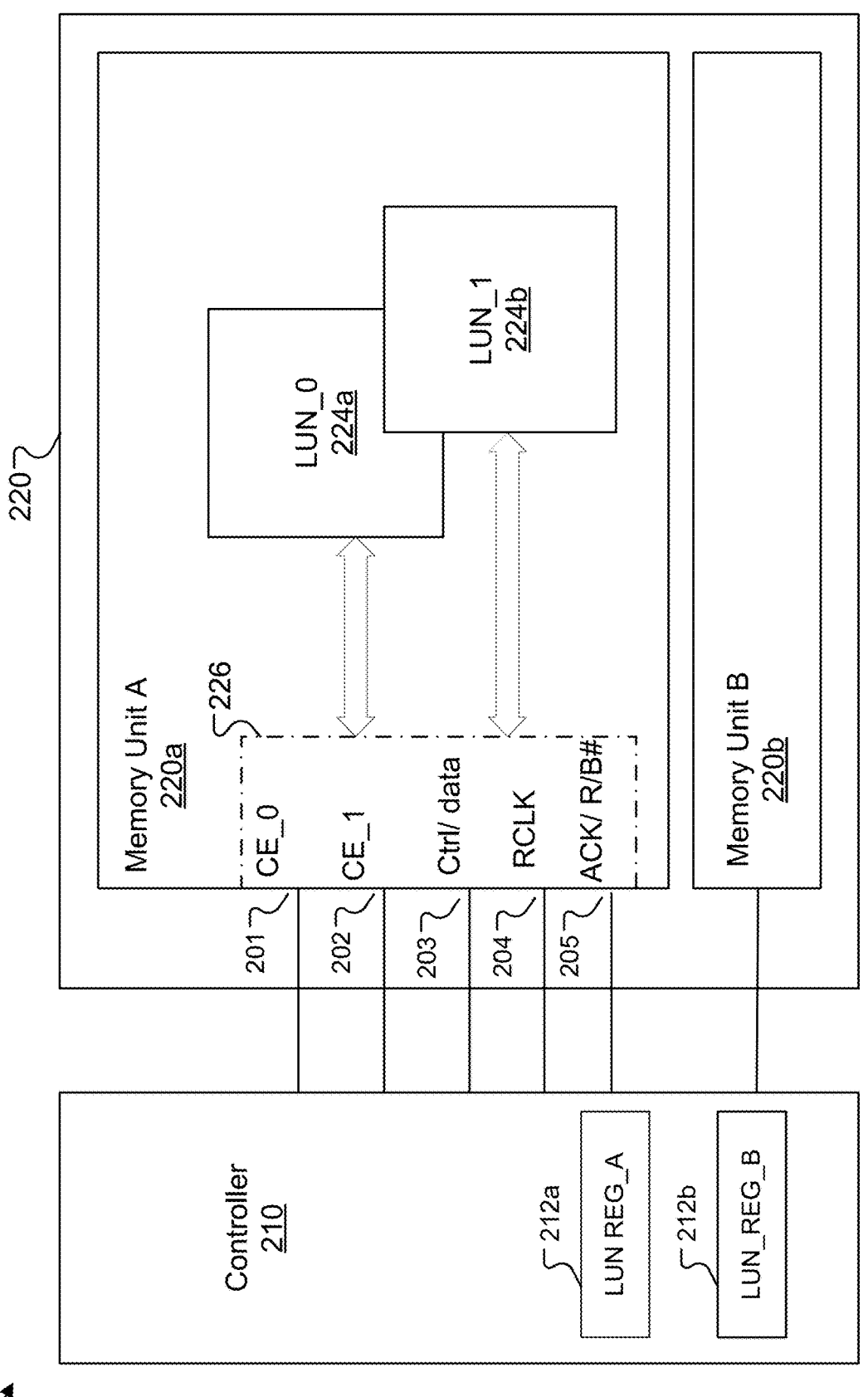
FIG. 2A illustrates an example of a system for addressing logic units in a memory device, according to one or more implementations of the present disclosure.

FIG. 2A illustrates an example of a system for addressing logic units in a memory device 200, according to one or more implementations of the present disclosure. The device 200 can include a controller 210 (e.g., the device controller 112 or the host controller 122 of FIG. 1) and a memory 220 (e.g., the memory 116 of FIG. 1). The device 200 can be the device 110 of FIG. 1.

As illustrated in FIG. 2A, the memory 220 includes one or more memory units, e.g., memory unit A 220a, memory unit B 220b. Each memory unit can include one or more LUNs, such as LUN_0 224a and LUN_1 224b of memory unit A 220a. For illustration purposes only, the memory unit 220a is described as an example of a memory unit.

As illustrated in FIG. 2A, the memory unit 220a includes LUN_0 224a and LUN_1 224b, which are coupled to an interface 226 that can include one or more pins and/or buses. The memory unit 220a is coupled to the controller 210 through the interface 226. The controller 210 can have a corresponding interface including one or more pins and/or buses corresponding to the one or more pins and/or buses in the interface 226 of the memory unit 220a. For example, the interface 226 can include chip enable (CE) pins CE_0 201 and CE_1 202 for LUNs 224a and 224b, respectively. The interface 226 can also include a control or data bus 203 through which the controller 210 can communicate with each of the LUNs 224a and 224b. The control or data bus 203 can have a width of multiple bits. For example, when the control or data bus 203 is implemented according to NAND Flash access protocols such as Open NAND Flash Interface (ONFI), the control or data bus 203 can have a width of 8 bits. The controller 210 can be configured to access the memory 220 according to a data access command that lasts one or more clock cycles. As an example, the data access command can use 5 cycles to specify the column address, the row address, and the LUN address of the data accessed in the memory 220.

The interface 226 can include a reporting clock (RCLK) pin 204 through which the controller 210 can send a clock signal to the memory 220 as a reference clock for synchronization. The interface 226 can further include a reporting pin 205, which, in some implementations, provides the controller 210 with information about the status (e.g., busy or ready) of the LUNs 224a and 224b. For example, if all the LUNs are ready, (e.g., available for access), the reporting pin 205 can be asserted to logic '1.' If one or more LUNs are busy (e.g., unavailable for access), the reporting pin 205 can be de-asserted to logic '0.' In these implementations, the reporting pin 205 can be referred to as a ready-busy (R/B #) pin or ready-busy interface. In some other implementations, the reporting pin 205 provides acknowledgement (ACK) to inquiries or commands sent by the controller 210. In these implementations, the reporting pin 205 can be referred to as an ACK pin. The reporting pin 205 can be coupled to reporting circuitry that facilitates the reporting of status or the acknowledgement to inquiries of commands.

The controller 210 has one or more registers, such as LUN registers 212a and 212b. The LUN registers 212a and 212b can store information that the controller 210 obtains from the memory 220. Example information includes the ready or busy status of LUNs in a memory unit, information provided by the memory unit in response to an inquiry or command, or preloaded manufacture information (e.g., serial number) of the LUNs.

Figure 2B:
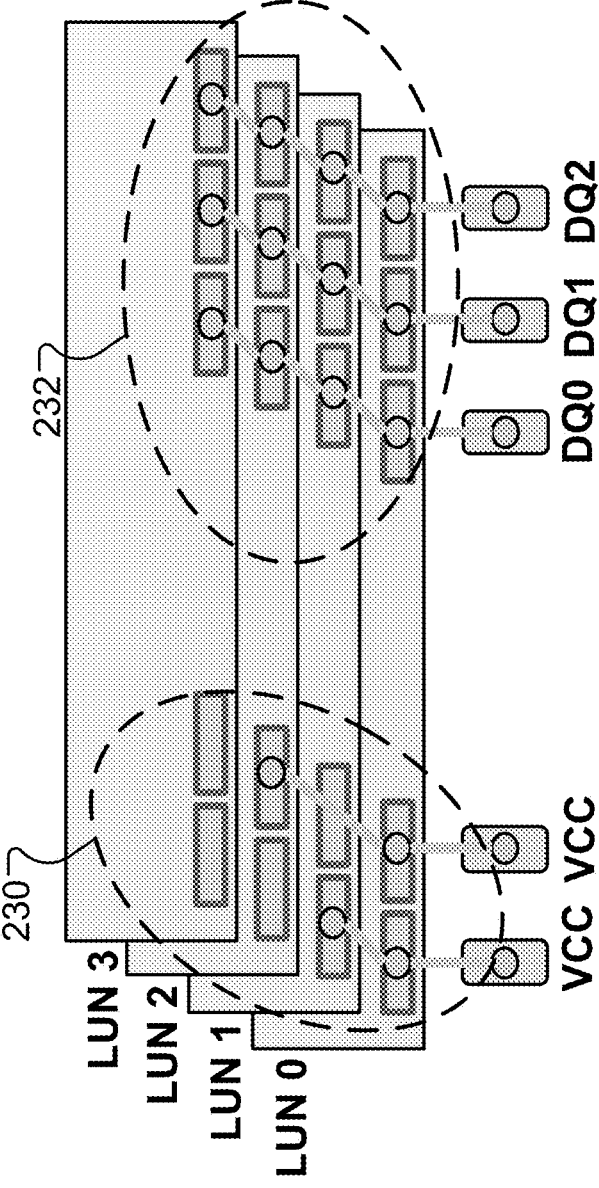
FIG. 2B illustrates an example structure of multiple logic units in a memory device, according to one or more implementations of the present disclosure.
Figure 2B:

FIG. 2B illustrates an example structure 240 of multiple LUNs LUN 0 to LUN 3, according to one or more implementations of the present disclosure. According to the structure 240, the LUNs are stacked one above another to form a three-dimensional arrangement. The structure 240 can be adopted to arrange LUNs 224a and 224b in the memory 220 of FIG. 2A.

LUNs LUN 0 to LUN 3 can have one or more data pads 232, which are routed in connection with data pins DQ0 to DQ2. Thus, when a LUN is accessed by a controller, the LUN can receive data from or provide data to the controller via the data pins.

LUNs LUN 0 to LUN 3 can have one or more addressing pads 230. In the illustrated structure 240, each LUN has two bits of addressing pads routed in connection with a supply voltage VCC, with the routing pattern of each LUN corresponding to a 2-bit address. For example, LUN 0 has both pads connected to VCC, so the routing pattern corresponds to '11.' LUN 1 and LUN 2 each have one pad connected to VCC, so the routing patterns correspond to '10' and '01,' respectively. LUN 3 has no pads connected to VCC, so the routing pattern corresponds to '00.' With this addressing mechanism, a controller can access a LUN by providing the corresponding 2-bit address of that LUN. For a structure with more LUNs stacked, the number of addressing pads can be different.

With the number of stacked LUNs growing, it becomes more and more challenging to manufacture and route the addressing pads. Accordingly, some implementations use one or more different addressing mechanisms to reduce the number of addressing pads. These implementations will be described with reference to FIGS. 2C-5B.

Figure 2C:
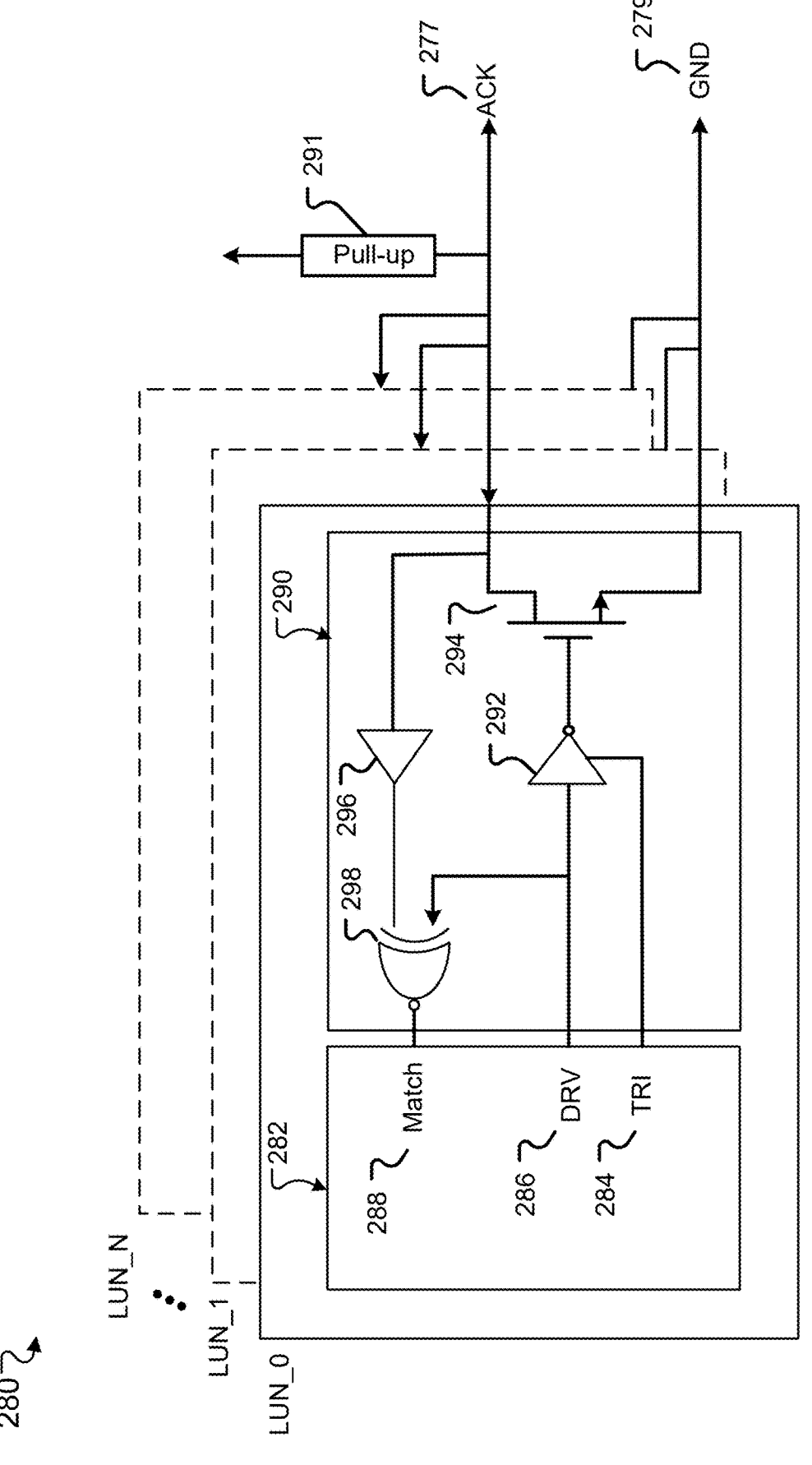
FIG. 2C illustrates example circuitry of logic units coupled to an addressing interface in a memory device, according to one or more implementations of the present disclosure.

FIG. 2C illustrates example circuitry 280 of LUNs LUN_0 to LUN_N coupled to an addressing interface in a memory device, according to one or more implementations of the present disclosure. The circuitry 280 can be used in the memory 220 of FIG. 2A. Each of the LUNs is individually and separately coupled to a control interface, which has one or more pins including a reporting pin ACK 277 (which can be the reporting pin 205 of FIG. 2A) and ground (GND) 279. The circuitry 280 can be the same for LUNs LUN_0 to LUN_N. Therefore, the description focuses only on LUN_0 as a representative LUN.

As illustrated in FIG. 2C, LUN_0 includes a control logic 282 and a reporting unit 290. The control logic 282 is coupled to the reporting unit 290 via a trigger node (TRI) 284, a drive node (DRV) 286, and a matching result node (Match) 288. The control logic 282 can be configured to sequentially drive (e.g., transmit) a series of bits to the reporting unit 290 via DRV 286. The control logic 282 can be configured to output a trigger signal via TRI 284 depending on the input value of Match 288. For example, if the input value of Match 288 is logic '1,' the control logic 282 can output a logic '1' via TRI 284. Conversely, if the input value of Match 288 is logic '0,' the control logic 282 can output a logic '0' via TRI 284.

The reporting unit 290 includes a buffer 292, a transistor 294, a comparator 298, and a buffer 296. The buffer 292 can be enabled/disabled based on the trigger signal from TRI 284. When enabled, the buffer 292 passes data driven from DRV 286 to the gate terminal of the transistor 294. The buffer 292 is illustrated in FIG. 2C as an inverted buffer. In other implementations, the buffer 292 is a non-inverting buffer.

Keeping with FIG. 2C, the transistor 294 can be a metal-oxide-semiconductor (MOS) transistor, such as an n-type MOS (NMOS) transistor as illustrated. The transistor 294 includes a gate terminal coupled to the output of the buffer 292, a first terminal (e.g., a drain terminal) coupled to the common reporting pin 277, and a second terminal (e.g., a source terminal) coupled to GND 279. A pull-up unit 291 (e.g., one or more pull-up resistors) is coupled to a node between the reporting pin 277 and the LUNs. When transistors 294 of all of the LUNs are switched off, the path from the reporting pin 277 to GND 279 is shut off, so the pull-up unit 291 is configured to pull up the voltage at the reporting pin 277 to a high level, e.g., '1.' Conversely, when the transistor 294 of any of the LUNs is switched on, the path from the reporting pin 277 to GND 279 is turned on, so the voltage at the reporting pin 277 is kept at a low level, e.g., logic '0.' This mechanism of coupling the LUNs to the control interface is referred to as an open-drain coupling, and the transistor 294 is referred to as an open-drain transistor.

The comparator 298 in the reporting unit 290 can be a NXOR gate that outputs a logic '1' if the logic values of its two inputs are equal. For example, when the logic value at the drain terminal of the transistor 294 (which equals the logic value at the reporting pin 277) is the same as the logic value at DRV 286, the comparator 298 outputs a logic '1.' Otherwise, the comparator 298 outputs a logic '0.' The output of the comparator 298, which is input to Match 288 of the control logic 282, thus indicates whether the value driven by the control logic 282 matches the value received by the control logic 282 from the control interface.

In an example operation, the control logic 282 drives a bit to the buffer 292 while enabling the buffer 292. If the driven bit is logic '0,' the buffer 292 outputs a logic '1,' which switches on the transistor 294, causing the value at the reporting pin 277 to be pulled down to logic '0.' If the driven bit is logic '1,' the buffer 292 outputs a logic '0,' which switches off the transistor 294 and causes the value at the reporting pin 277 to be pulled up to logic '1.' Accordingly, with the circuitry shown in FIG. 2C, the reporting unit 290 is configured to pass the same value driven from DRV 286 to the reporting pin 277.

When other LUNs perform similar operations to respectively drive bits to the reporting pin 277, there can be a race. For example, whichever LUN that drives a logic '0' to the reporting pin 277 can pull down the value at the reporting pin 277. As such, the other LUNs can no longer drive logic 'Is' to the reporting pin 277 because of the path from the reporting pin 277 to GND 279. Thus, for those LUNs that attempt to drive logic 'Is,' their respective comparators 298 output a logic '0' to indicate a mismatch between the driven value at DRV 286 and the received value at the reporting pin 277. Once a LUN detects a mismatch at Match 288, the LUN can de-assert TRI 284 such that no additional bits are driven from DRV 286 to the gate of the transistor 294. In other words, a LUN drops out from the race if it detects a mismatch at Match 288. The remaining LUNs can continue to respectively another bit in another round of race. If each LUN has a unique series of bits to drive, then, after a finite number of rounds of race, only one LUN from LUN_0 to LUN_N wins out.

This mechanism of operation is not limited to the circuitry illustrated in FIG. 2C. For example, in a variation of the circuitry of FIG. 2C, a non-inverting buffer can be used in lieu of the buffer 292, and an XOR gate can be used as the comparator 298 in lieu of the NXOR gate. In another variation of the circuitry of FIG. 2C, a non-inverting buffer can be used in lieu of the buffer 292, and a p-type MOS (PMOS) transistor can be used as transistor 294 in lieu of the NMOS transistor.

In some implementations, each LUN is associated with a unique identifier (ID), such as a serial number assigned by manufacturer or a physical unclonable function (PUF), which can include a series of bits. Employing the race mechanism described above, the LUNs in a memory unit can be ranked according to their IDs and can each obtain an index indicating their standing in the rank. For example, a host can iteratively send an enumeration command to the LUNs in a memory unit via a controller. Upon receiving the enumeration command in an iteration, the LUNs can race to sequentially drive their respective unique IDs to the control interface. Because each ID is unique, only one LUN wins out in each iteration, with the other LUNs dropping out at some rounds. The winning LUN can thus obtain an index that stops participating in the following iterations of race. Thus, as the iterations move on, fewer and fewer LUNs participate, and eventually each LUN obtains an index that indicates its ranking among all of the LUNs of a memory unit. The host stops sending enumeration commands when no LUNs participate in the race.

As an example, for a memory unit with four LUNs, the host can send an enumeration command in four iterations such that each LUN receives an index, 1, 2, 3, and 4, respectively. The fifth time the host sends an enumeration command, no LUNs participate in the race, so the host can understand that all LUNs of the memory unit have been assigned an index.

In the enumeration process described above, the control logic of each LUN can keep track (e.g., using a counter) of a number of the current iteration. Alternatively or additionally, the host can provide the number of the current iteration within the enumeration command. The winning LUN in each iteration can refer to either its own counter or the number provided in the enumeration command to determine its index.

In some implementations, a LUN stores the index in a non-volatile (NV) fuse of the control logic. The storage of the LUN index in an NV fuse can take place at the time a memory unit is manufactured and initialized. In some implementations where the LUN does not have an available NV fuse, the LUN stores the index in a volatile register of the control logic, so the controller and the LUNs can perform the enumeration process at the beginning of each power cycle. With the LUNs each assigned an index, the host can access the LUNs by specifying the index of a target LUN, and the LUN having that specified index can respond to the access requested by the host. The addressing of LUNs can be done through the control interface between the controller and the LUNs, e.g., through only one addressing pad that is coupled to the control interface. This way, fewer addressing pads are needed in a memory device compared to the structure 240, and the complexity of routing the addressing pads is reduced.

Figure 3:
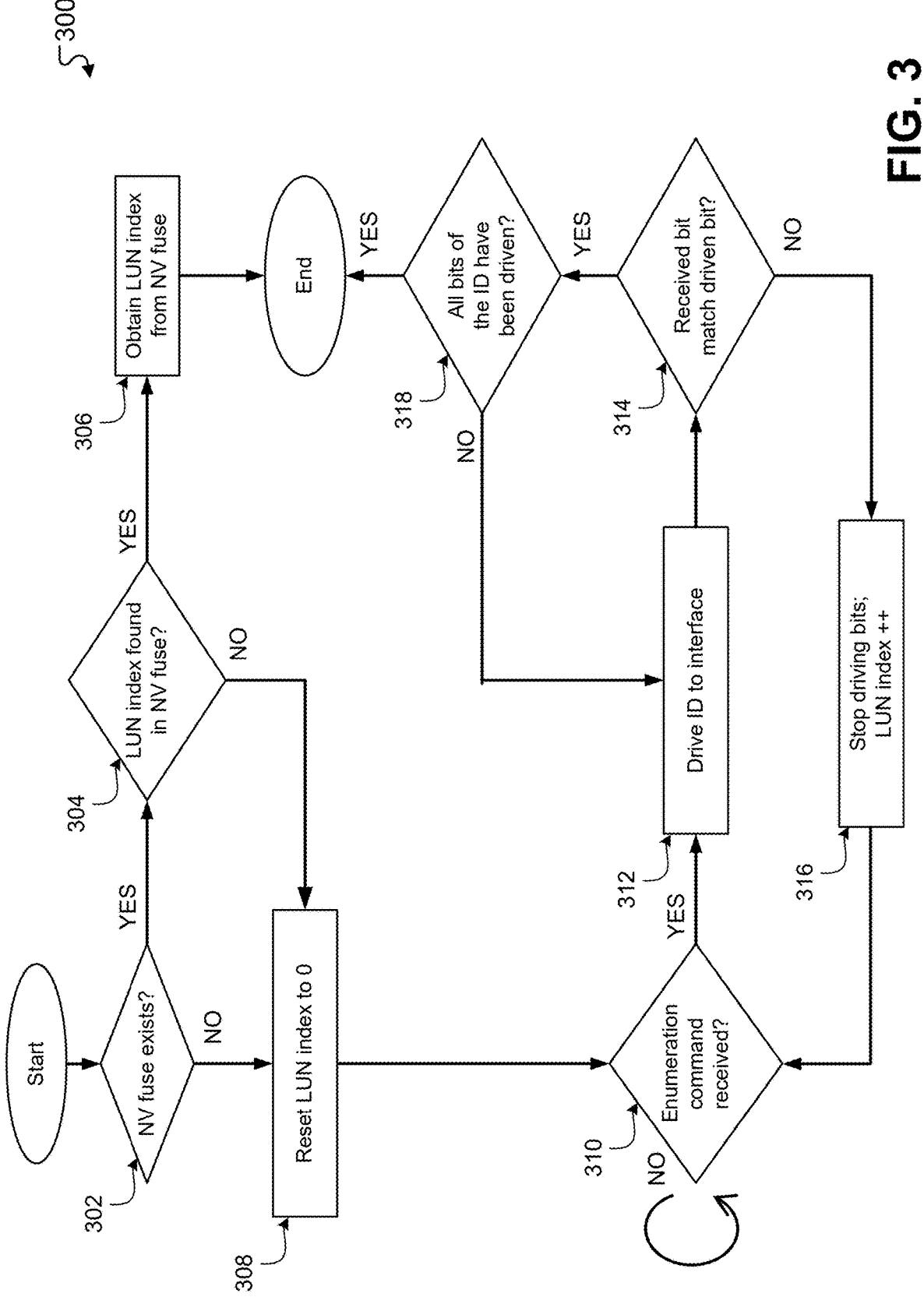
FIG. 3 is a flowchart showing an example process for managing logic units of a memory device, according to one or more implementations of the present disclosure.

FIG. 3 is a flowchart showing an example process 300 for managing logic units of a memory device, according to one or more implementations of the present disclosure. The process 300 can be performed by a LUN of a memory unit. One or more operations of the process 300 are similar to the operations described with reference to FIG. 2C.

At 302, the LUN determines whether it has an NV fuse. If Yes, the process 300 moves to 304 to determine whether the NV fuse already stores the LUN index. If the LUN index is found in the NV fuse, then the LUN can load the existing LUN index at 306 and the process 300 can move to an end.

If either 302 or 304 returns No, then the process 300 moves to 308 for the LUN to start an enumeration process. To start the enumeration process, the LUN resets the LUN index (either in the NV fuse or in the volatile register) to 0, indicating that the upcoming iteration will be the first iteration.

At 310, the LUN waits until an enumeration command is received from a host. Once the enumeration command is received, the process 300 moves to 312, at which the LUN starts to sequentially drive bits of its ID to the control interface (e.g., the reporting pin 277 of FIG. 2C).

At 314, the control logic (e.g., the control logic 282 of FIG. 2C) of the LUN determines, based on a comparator output of the reporting unit (e.g., the reporting unit 290 of FIG. 2C), whether the received bit from the control interface matches the driven bit. If the answer is No, then the LUN drops out from the race. To drop out, the LUN increments the index by 1 at 316 and waits for another enumeration command in the next iteration.

If the answer at 314 is Yes, then the LUN stays in the race and moves to 318. At 318, the LUN determines whether all bits of its ID have been driven. If Yes, then the LUN considers the current iteration is over and the LUN has won out. In some implementations, the LUN directly moves to end the process 300, without storing its current index. In some implementations, the LUN stores its current index and moves to end the process 300. A controller (e.g., the controller 210 of FIG. 2A) can store a corresponding index of the LUN, e.g., by checking a status of the LUN such as whether the LUN completes driving all bits of the ID of the LUN. In some implementations, after the controller receives all bits of the ID of the LUN, the controller stores the ID of the LUN. If No, then it means there are additional bits to drive before the iteration is over. The LUN thus repeats 312 to continue driving the remaining bits.

Figures 4A, 4B:
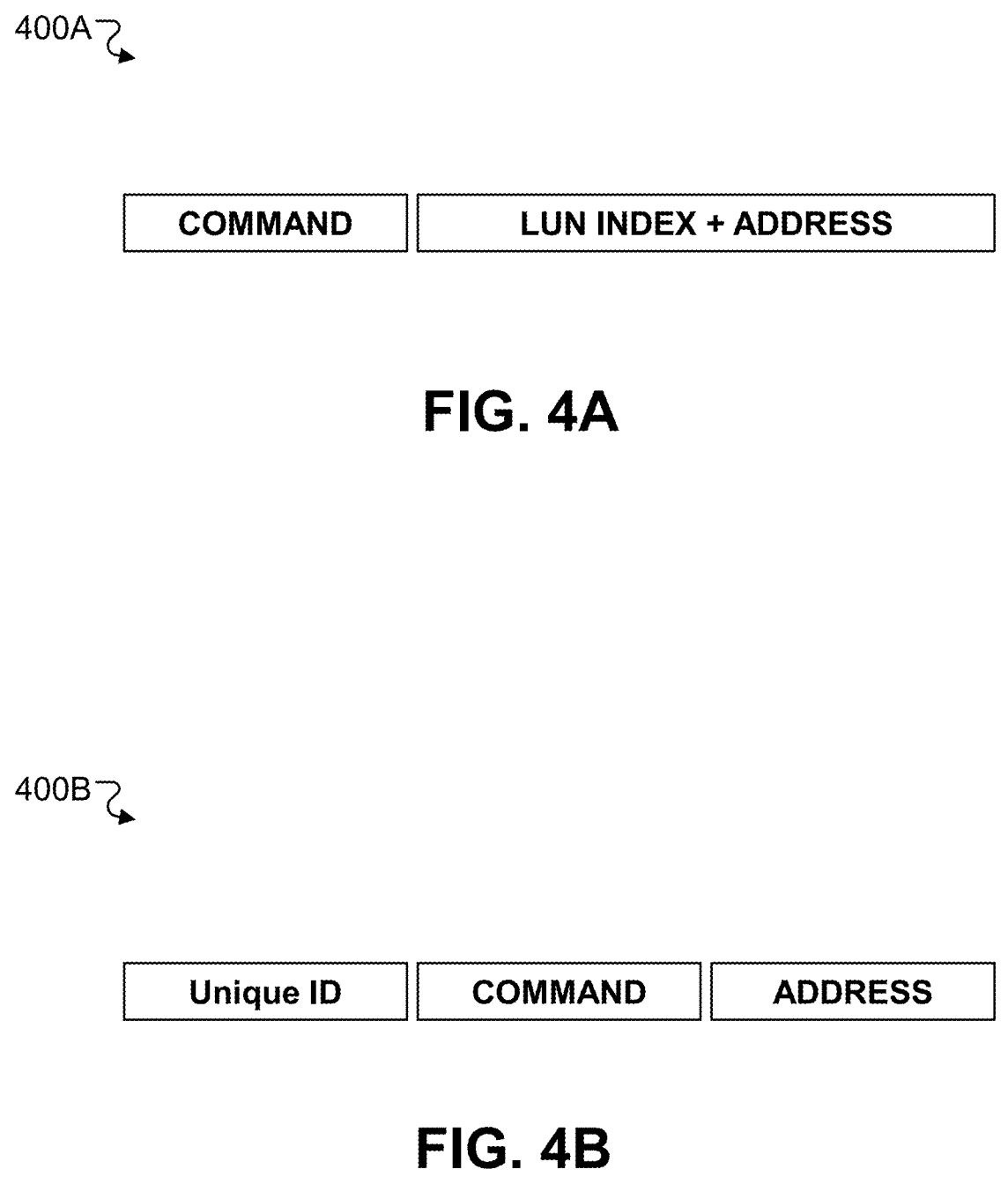

FIGS. 4A and 4B each illustrate an example message structure 400A and 400B, respectively, according to one or more implementations of the present disclosure. A host can, via a controller coupled to a memory unit, access one or more LUNs of the memory unit by sending a message with the structure 400A or 400B to the controller.

As shown in FIG. 4A, the message structure 400A includes a field of Command, which can specify the type of access requested by the host, such as Read, Write, and Reset. The message structure 400A also includes one or more fields that specify the address of the memory unit and the index of the LUN within the memory unit. Upon receiving the message, each LUN can compare the received LUN index with the index obtained during the enumeration process. The LUN that has the specified LUN index can respond to the host's access request.

As shown in FIG. 4B, the message structure 400A includes a field of Command, which can specify the type of access requested by the host, such as Read, Write, and Reset. The message structure 400B also includes a field that specifies the address of the memory unit. Different from the message structure 400A that specifies the index of a LUN, the message structure 400B has a field that specifies a unique ID of the LUN. For example, the host can obtain a list of the serial numbers of all LUNs of a memory unit and request the memory access be performed on a LUN by specifying the serial number of that LUN. The host can obtain the list of the serial numbers from the reporting of the LUNs, e.g., during the enumeration process in which each LUN reports its serial number to the control interface.

A host can use the message structures 400A or 400B, or similar message structures, to provide a special access message to the LUNs. As an example, a host can set the LUN index to 0xFF in a message according to the message structure 400A, even if none of the LUNs in a memory unit has an index of 0xFF. Upon receiving the special access message, the control logics of the LUNs recognize the special access message and perform a predefined responsive action. The responsive action to the special access message can be, e.g., wiping out all data, clearing all stored LUN indices, performing a manufacturer reset, execution of a preloaded diagnosis program, etc.

Figure 5B:
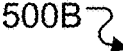
Figure 5B:
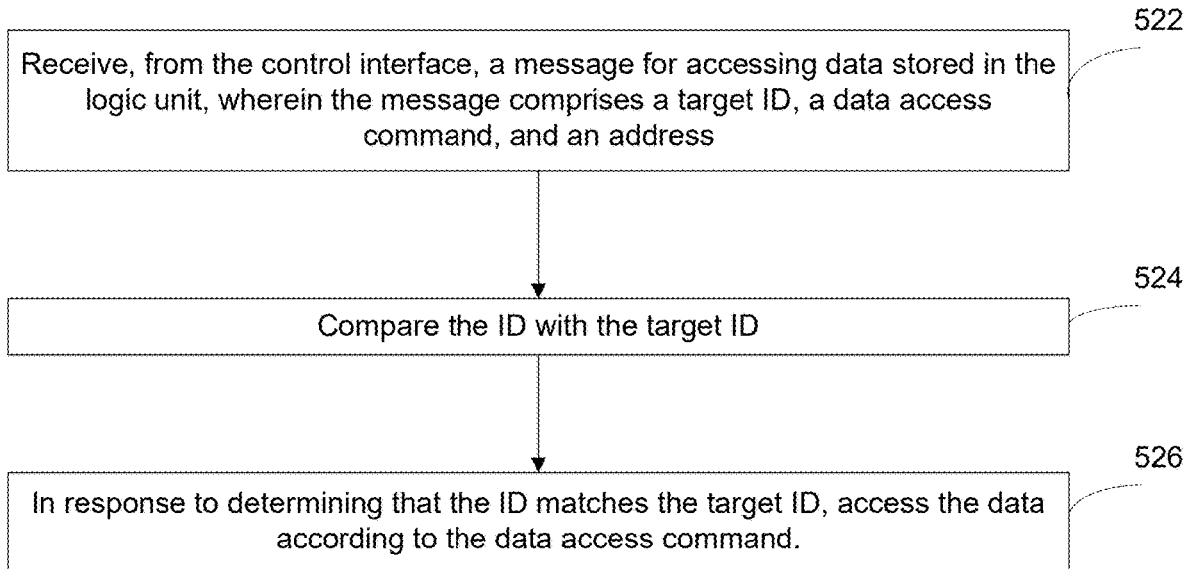

FIGS. 5A and 5B each illustrate a flowchart showing an example method 500A and 500B, respectively, according to one or more implementations of the present disclosure. The methods 500A and 500B can be performed by a LUN of a memory unit. One or more operations of the methods 500A and 500B are similar to the operations described with reference to FIGS. 2C and 3.

Starting from the method 500A, at 502, a LUN receives an enumeration command from the control interface.

At 504 of the method 500A, the LUN sequentially drives one or more bits of an ID associated with the LUN to the control interface. The ID can be driven via, a reporting unit of the LUN.

At 506 of the method 500A, the LUN determines that one or more received bits from the control interface match the one or more bits of the ID. The match can indicate that, after one or more rounds, the LUN wins out in the race with other LUNs.

At 508 of the method 500A, the LUN stores a LUN index according to a number of iteration of the enumeration command. As described previously, after the LUN wins out in an iteration of one or more rounds of race, the LUN stores the iteration number as its LUN index. The host can access the LUN by specifying the LUN index in a data access command.

Moving to the method 500B, at 522, a LUN receives, from a control interface, a message for accessing data stored in the LUN. The message can include a target ID (e.g., a serial number of a target LUN to be accessed), a data access command (e.g., read, write, or reset), and an address of the LUN in the memory unit.

At 524 of the method 500B, the LUN compares the target ID with its own unique ID.

At 526 of the method 500B, in response to determining that the LUN's own unique ID matches the target ID, the LUN accesses its stored data according to the data access command.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A semiconductor device comprising:
    a logic unit associated with an identifier, the logic unit comprising a control logic and a reporting unit coupled to the control logic; and
    a control interface coupled to the reporting unit,
    wherein the control logic is configured to:

receive, from the control interface, an enumeration command in an iteration, drive, using the reporting unit, one or more bits of the identifier to the control interface, and in response to determining that a received bit from the control interface mismatches a driven bit of the identifier, stop driving one or more additional bits of the identifier to the control interface.

2. The semiconductor device of claim 1, wherein the control logic is configured to:

in response to determining that received bits from the control interface match driven bits of the ID, store a logic unit index in the control logic according to a number of the iteration.

3. The semiconductor device of claim 2, wherein the control logic is configured to:

in response to determining that the received bits from the control interface match the driven bits of the identifier, disable driving bits of the identifier to the control interface in one or more sequential iterations.

4. The semiconductor device of claim 2, wherein the control logic comprises at least one of:

a non-volatile fuse configured to store the logic unit index, or a volatile register configured to store the logic unit index.

5. The semiconductor device of claim 2, wherein the logic unit is configured to receive a message for accessing data stored in the logic unit, and wherein the message comprises the logic unit index, an address of the logic unit, and a data access command.

6. The semiconductor device of claim 2, wherein the enumeration command comprises the number of the iteration.

7. The semiconductor device of claim 2, wherein the reporting unit comprises a comparator configured to compare the received bits with the driven bits of the identifier, and wherein the control logic is configured to determine that the received bits match the driven bits of the identifier based on an output of the comparator.

8. The semiconductor device of claim 1, wherein the reporting unit is coupled to the control interface via an open drain circuit.

9. The semiconductor device of claim 1, wherein the identifier comprises at least one of:

a serial number of the logic unit, or a physical unclonable function (PUF) of the logic unit.

10. The semiconductor device of claim 1, wherein the logic unit comprises at least one of a NAND flash die or a NOR flash die.

11. The semiconductor device of claim 1, wherein the logic unit is configured to:

receive, from the control interface, a message for accessing data stored in the logic unit, wherein the message comprises a target identifier, a data access command, and an address, compare the identifier with the target identifier, and in response to determining that the identifier matches the target identifier, access the data according to the data access command.

12. The semiconductor device of claim 11, wherein the logic unit is further configured to:

receive, from the control interface, an access message, and perform a responsive action according to the access message.

13. A method for operating a logic unit in a semiconductor device, the method comprising:

receiving, from a control interface of the semiconductor device, an enumeration command in an iteration;

driving one or more bits of an identifier associated with the logic unit to the control interface; and in response to determining that a received bit from the control interface mismatches a driven bit of the identifier, stopping driving one or more additional bits of the identifier to the control interface.

14. The method of claim 13, wherein the logic unit is a first logic unit and the identifier is a first identifier, and wherein the semiconductor device further comprises a second logic unit associated with a second identifier, and wherein the method further comprises:

receiving, from the control interface, a second enumeration command in a second iteration;

driving one or more bits of the second identifier associated with the second logic unit to the control interface; and in response to determining that received bits from the control interface match driven bits of the second identifier, storing a logic unit index for the second logic unit in the control logic according to a number of the second iteration, and disabling driving bits of the second identifier to the control interface in one or more sequential iterations.

15. The method of claim 14, wherein storing the logic unit index comprises:

storing the logic unit index in at least one of a non-volatile fuse or a volatile register.

16. The method of claim 14, further comprising:

accessing data stored in the second logic unit according to a message, wherein the message comprises the logic unit index, an address of the second logic unit, and a data access command.

17. The method of claim 13, further comprising:

receiving, from the control interface, a message for accessing data stored in the logic unit, wherein the message comprises a target identifier, a data access command, and an address;

comparing the identifier with the target identifier; and in response to determining that the identifier matches the target identifier, accessing the data according to the data access command.

18. The method of claim 17, further comprising:

receiving, from the control interface, an access message; and performing a responsive action according to the access message.

19. A memory system, comprising:

a memory device comprising an array of memory cells; and a controller coupled to the memory device and configured to control the memory device, wherein the memory device comprises:

a logic unit associated with an identifier, the logic unit comprising a control logic and a reporting unit coupled to the control logic; and a control interface coupled to the reporting unit, wherein the control logic is configured to:

receive, from the control interface, an enumeration command in an iteration, drive, using the reporting unit, one or more bits of the identifier to the control interface, and in response to determining that a received bit from the control interface mismatches a driven bit of the identifier, stop driving one or more additional bits of the identifier to the control interface.

20. The memory system of claim 19, wherein the control logic is configured to:

in response to determining that received bits from the control interface match driven bits of the identifier, store a logic unit index in the control logic according to a number of the iteration, and disable driving bits of the identifier to the control interface in one or more sequential iterations.

\* \* \* \* \*